Dec. 18, 1923.

E. G. HULSE 1,477,564

RESILIENT TIRE

Original Filed March 22, 1923

EDISON G. HULSE  
INVENTOR.

BY  
*R. H. Waters*  
ATTORNEY.

Patented Dec. 18, 1923.

1,477,564

UNITED STATES PATENT OFFICE.

EDISON G. HULSE, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

RESILIENT TIRE.

Original application filed March 22, 1923, Serial No. 626,854. Divided and this application filed April 26, 1923. Serial No. 634,744.

*To all whom it may concern:*

Be it known that I, EDISON G. HULSE, a citizen of the United States, residing at Cumberland, in the county of Allegany and State of Maryland, have invented certain new and useful Improvements in Resilient Tires, of which the following is a specification.

This application is a division of my companion application, Serial No. 626,854, filed March 22, 1923, and as such, more particularly describes and claims certain novel features illustrated, generally, in the prior case.

The present invention relates, specifically, to the type of resilient vehicle tire mainly dependent for resiliency upon the presence of stress-relieving voids active within that portion of the structure subject to strains of great intensity set up within the zone of traction. Among the several advantages and objectives attained by my novel construction, the following are the more prominent:

The attainment of a high degree of resiliency by the provision of a novel type of internal void which does not materially weaken the structure.

The provision of internal voids intended to provide a variable degree of resiliency, definitely related to the increment of load on the tire, whereby, in the presence of relatively moderate loadings, the tire will be initially highly resilient, but progressively stiffen and become more resistant to distortion in the presence of excessive loads without, however, losing the benefit of the presence of that portion of the internal void which retains its integrity, overloaded.

The provision, in the novel design of the internal voids, of means whereby road accretions are expelled and the heat of internal friction of the tire mass effectively dissipated.

With these and other objects in view, as more particularly emphasized in the following discussion and in the drawings and claims, my invention resides in the novel means availed of in the composite tire structure chosen as a means for illustrating a preferred form of my invention.

Figure 1:
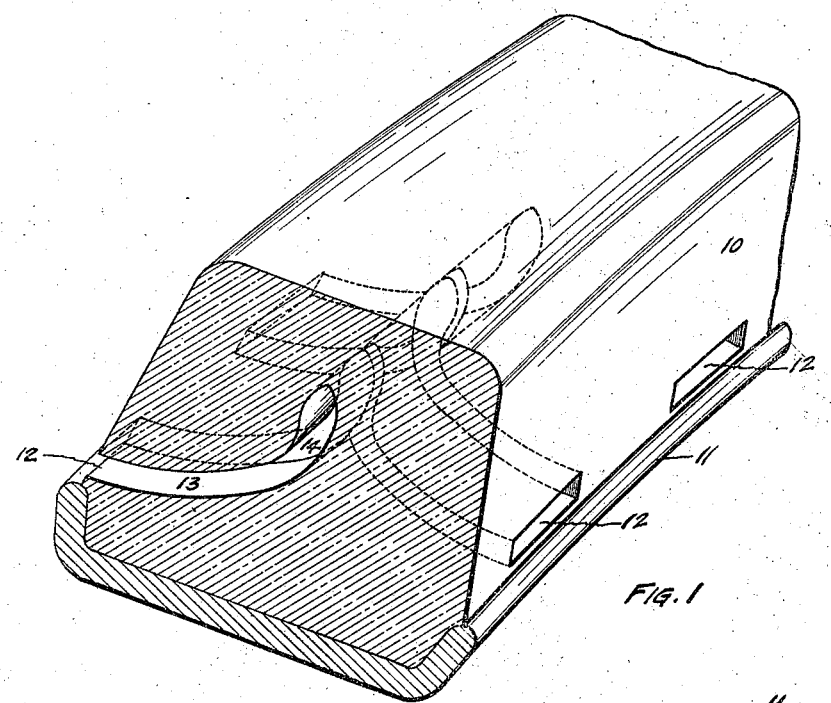
Figure 1 represents a cross section and partially executed perspective of a tire embodying my novel improvements, it being noted that only so much of the method of working the peculiar internal voids, as necessary to illustrate the basic thought, is indicated.

Referring particularly to the drawings, numeral 10 represents the resilient tire mass, preferably vulcanized in a permanent manner upon an annular base rim 11. The system of voids comprises a plurality of regularly spaced arcuate openings, said openings preferably being of rectangular cross section and having the longer axis of said cross section disposed circumferentially of the tire. These voids have external orifices 12 originating close to the base rim from whence their arcuate portions 13 sweep inwardly and upwardly toward the tread to terminate in an arch effect within the zone 14 in the median plane of the tire structure and relatively close to the tread surface.

Figure 3:
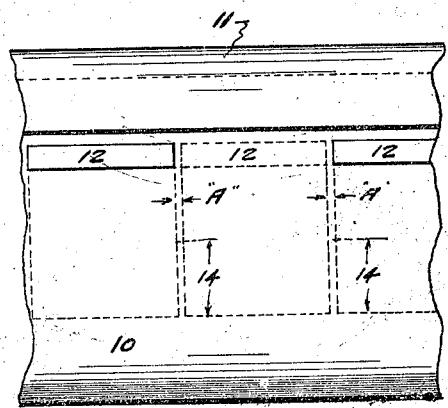
Fig. 3 is a side view of a fragment of the tire, not loaded, showing the staggered relation of the voids which work their way inwardly and toward the tread in arcuate paths whereby their inner termini extend within the median plane of the structure, thereby creating a substantially circumferential and continuous void in the said median plane.

These arcuate voids are preferably formed by introducing metallic cores within the soft, unvulcanized, structure prior to the molding operation—alternately from each side—and these appliances are afterwards withdrawn, leaving the voids clear. In view of this preferred method of forming the voids, it is usual to provide a slight clearance (see "A" Fig. 3) between the cores on alternate sides of the tire, merely to obviate the necessity for precision molding. The clearance "A," if maintained, results in the isolation of each void within the zone 14 by creating a thin filamentary wall of rubber, of a thickness "A," at this point. This wall may, of course, be perforated at will.

Figure 2:
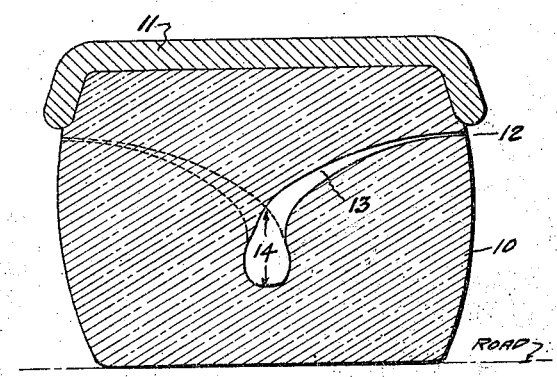
Figure 2 shows a cross section of the same structure illustrated in Fig. 1, but under load, whereby the process of closing up of the portions of the voids that impart the high degree of initial resiliency is clearly manifest. Also the ultimate resiliency-imparting void, taking the form of a substantially continuous circumferential void in the median plane of the structure, is clearly shown.

The chief purpose of this novel void, or system of voids, is apparent by reference to Fig 2, wherein the tire is shown under considerable load. When the tire is nominally loaded the elongated orifices 12 will be but slightly constricted and will serve as a primary or initial means for imparting resiliency. Under normal loadings, these openings will act as constantly vibrating spring members, normally open and actively responsive to take up casual road shocks as the rebounding sub-surface material flows into them. As the tire is overloaded, these orifices progressively close as do the outwardly directed arcuate portions 13 of the voids, but the central void 14 has the inherent property of always remaining open with attenuated portions of the void 13; thus, regardless of the closing of portions 12, under sudden shock, or a static condition of overload, the ultimate resiliency of the system is preserved, as explained. In other words, even though the initial, lively, responsive, resilient properties may be lost with the constriction of voids 12, yet the remaining extent of the resiliency imparting system is unimpaired.

As an additional advantage of venting the central void to the atmosphere, in the manner described, attention is called to the well-known tendency of large truck tires to generate intense and destructive internal heat. The heat of friction thus generated will be readily dissipated by the voids of my invention. In fact, the peculiar design of these features will cause air to be alternately sucked into and expelled from the voids, due to the palpitation of the outer limits of the duct 13 as those members become successively exposed to the distortion of the mass within the area of rolling contact.

A further advantage residing in the direction chosen for these ducts 13 is that any casual road accretions, or water, that may find entrance within the central void when the particular receiving orifice is close to the road will promptly roll out of the same orifice when the tire assumes a different stage of rotation.

In the selection of a preferred cross sectional form of the tire to work to the best advantage in coordinate relation with my novel improvements, the trapezoidal type has been illustrated, with the shorter of the parallel sides constituting the tread portion. In this trapezoidal type the loaded nose portion of the tread will resist "mushrooming" and the sides will not bulge unduly; thus offering superior inherent weight-bearing characteristics, and causing the loaded side walls to react to best advantage within the zone of influence of the orifices 12.

Having now described my invention, in its preferred form, but without desiring to be limited to the precise example disclosed, what I claim is:

1. A resilient tire having circumferentially extensive sub-tread voids vented through the side walls by ducts inclined toward the base thereof.

2. A resilient tire having circumferentially extensive sub-tread voids vented alternately through the opposed side walls by ducts inclined toward the base thereof.

3. A resilient tire having circumferentially extensive sub-tread voids in the medium plane vented alternately through the side walls by ducts inclined toward the base thereof.

4. A resilient tire having sub-tread voids vented through the side walls by ducts inclined toward the base thereof, said ducts having orifices with major axes disposed circumferentially of the said tire.

5. A resilient tire having sub-tread voids vented through the side walls by ducts arcuately inclined toward the base thereof.

6. A resilient tire having sub-tread voids vented through the side walls by ducts arcuately inclined toward the base thereof, said ducts having orifices with major axes disposed circumferentially of the said tire.

7. A resilient tire having sub-tread voids vented alternately through the opposed side walls by ducts arcuately inclined toward the base thereof, said ducts having orifices relatively close to the said base with major axes disposed circumferentially of the said tire.

8. A resilient tire having uniformly spaced resiliency-imparting sub-tread voids originating on alternating sides of the tire in orifices and converging toward the tread to termini relatively close thereto.

9. A resilient tire having resiliency-imparting sub-tread voids originating on alternate sides of the tire in orifices having their major axes disposed circumferentially thereof and converging toward the tread to terminate in approximately the median plane of said tire.

10. A resilient tire having circumferentially extensive resiliency-imparting sub-tread voids originating alternately in orifices near the tire base in the opposed side walls, said voids being arcuately inclined from said origin toward the tread and terminating relatively close thereto.

In testimony whereof I affix my signature.

EDISON G. HULSE.